United States Patent Office 3,574,224
Patented Apr. 6, 1971

3,574,224
5-METHYLISOINDOLO[1,2-b]BENZOTHIAZOL-12-ONE
Hans Hoehn, Regeusburg, and Egon Roesch, Lampertheim, Germany, assignors to E. R. Squibb & Sons, Inc., New York, N.Y.
No Drawing. Filed July 12, 1968, Ser. No. 744,304
Int. Cl. C07d 99/06
U.S. Cl. 260—304     1 Claim

ABSTRACT OF THE DISCLOSURE

This invention relates to 5-methylisoindolo[1,2-b]benzothiazol-12-one which is useful as an anti-inflammatory agent.

This invention relates to 5-methylisoindolo[1,2-b]benzothiazol-12-one which has the formula (I) 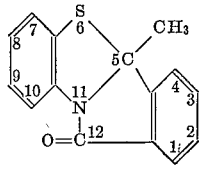

5-methylisoindolo[1,2-b]benzothiazol-12-one is prepared by reacting o-mercaptoaniline with an acetophenone-o-carbonic acid derivative of the general formula (II) 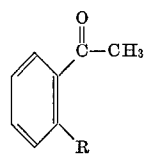

wherein R represents a group which may be converted into the carboxyl group, e.g., an ester group. Preferably, the water resulting from the condensation is removed with a dehydrating agent.

The new compound of this invention has anti-inflammatory properties and is useful as an anti-inflammatory agent, for example, to reduce local inflammatory conditions such as those of an edematous nature, in various animals such as rats, dogs and the like, when given orally in dosages of about 5 to 50 mg./kg. per day, preferably 5 to 25 mg./kg. per day, in single or 2 to 4 divided doses, as shown by the carageenan edema assay in rats. The compound may be utilized in compositions containing up to about 300 mg. of a compound of Formula I made up in conventional manner with vehicle or carrier for oral administration to animals as indicated above.

The following examples are illustrative of the invention.

EXAMPLE 1

In a flask with a capacity of 2 liters which is equipped with a reflux condenser and stirrer, there are introduced 8 to 10 ml. of xylene, 124 grams of o-mercaptoaniline and 148 grams of acetophenone-o-carbonic acid. The mixture is refluxed and stirred for seven hours. Over this period, 30.8 ml. of water are separated. The xylene is then evaporated in vacuo from the still warm reaction mixture and the residual oil is triturated with approximately 150 ml. of alcohol whereupon a rapid crystallization occurs. After standing overnight the 5-methylisoindolo-[1,2-b]benzothiazol-12-one is filtered under suction and then washed with a little cold alcohol.

Yield: 185 grams=81% of theory, M.P. 101–102° C. After recrystallization from alcohol a product melting at 103–104° C. is obtained.

EXAMPLE 2

If the acetophenone-o-carbonic acid is replaced with the stoichiometric amount of its ester in Example 1, 5-methylisoindol[1,2-b]benzothiazol-12-one is obtained in a yield of 86%.

What is claimed is:
1. 5-methylisoindolo[1,2-b]benzothiazol-12-one.

References Cited

Oliver et al., J. Am. Chem. Soc., 80, pp. 702–7 (1958).

ALEX MAZEL, Primary Examiner
R. J. GALLAGHER, Assistant Examiner

U.S. Cl. X.R.

260—476, 515; 424—270